United States Patent [19]

Gompers

[11] Patent Number: 4,720,934
[45] Date of Patent: Jan. 26, 1988

[54] READILY DISSEMBLED SMALL ANIMAL TRAP

[76] Inventor: William J. Gompers, 824 McLaughlin Run Rd., Bridgeville, Pa. 15017

[21] Appl. No.: 902,522

[22] Filed: Sep. 2, 1986

[51] Int. Cl.⁴ .............................................. A01M 23/26
[52] U.S. Cl. .......................................... 43/89; 43/81; 43/96
[58] Field of Search ................... 43/89, 58, 88, 96, 81

[56] References Cited

U.S. PATENT DOCUMENTS

| 1,331,324 | 2/1920 | Dickson | 43/89 |
| 2,408,593 | 10/1946 | Barber | 43/89 |
| 3,896,581 | 7/1975 | Gabry | 43/81 |
| 4,393,617 | 7/1983 | Charnoske | 43/96 |
| 4,411,091 | 10/1983 | Hedstrom | 43/89 |
| 4,458,394 | 7/1984 | Schultz | 43/96 |

FOREIGN PATENT DOCUMENTS

| 867032 | 3/1971 | Canada | 43/96 |
| 0182556 | 5/1986 | European Pat. Off. | 43/58 |
| 2544586 | 10/1984 | France | 43/58 |

*Primary Examiner*—Kurt Rowan

[57] ABSTRACT

A small animal trap comprises a frame having an entrance and an exit, and a readily detachable means for retaining a spring actuated animal grasping device therein.

1 Claim, 4 Drawing Figures

READILY DISSEMBLED SMALL ANIMAL TRAP

TECHNICAL FIELD

This invention relates to animal traps and particularly to traps for catching squirrels, raccoons and similar animals which take up residence in attics and under eaves of human homes.

BACKGROUND ART

In recent years, the suburban and urban areas of the United States have seen an increase in the number of raccoons, squirrels, and other animals which normally live in the wild but which have adapted to environments with concentrated human habitation. The raccoons sometimes initially live in storm sewers and other man-made recesses more or less similar to the ones they occupy in nature. They reproduce, sometimes miles from a forest or woods, typically in single-family neighborhoods of cities or suburbs. Reproducing in such neighborhoods, they soon take to living in chimneys, attics, and under the eaves of homes. The unsanitary habits of squirrels and raccoons and the destruction caused by them have been difficult problems for many years.

Squirrels, raccoons, and other readily adaptive animals create or enlarge accesses into attics and under the eaves of houses, which leads to other problems such as chewing wiring, destroying or rearranging insulation, and depositing fecal material throughout. In addition, the noise alone which squirrels and raccoons sometimes make can be unsettling or annoying if not frightening.

Because of the generally difficultly accessible areas in which the animals live, it has been notoriously hard to control such intrusions by raccoons, squirrels and the like. Traps are generally bulky and difficult to handle, especially if one must work from a ladder or a more or less precarious position on a roof or while crawling under the shallow side of a roof in an attic. Frequently it will be desirable to reset a trap quickly and conveniently after it has caught an animal.

While a raccoon trap such as the one shown in U.S. Pat. No. 4,483,093 will of course operate, it is not suitable for use in a home, since it will cause much pain and suffering to the animal; moreover, it does not have the advantage of my trap in that the animal cannot be swiftly removed and the works replaced in a matter of seconds. In addition, the trap is not designed to channel the animal through the frame, i.e. to occupy the animal's normal path or passageway; it must be enticed by the bait alone. The reader may also be interested in U.S. Pat. No. 4,267,660, which, however, is also not designed for use in the home.

A trap available commercially and commonly used in residences comprises a box-like wooded frame and a spring-actuated trap mechanism within it. The entranceway may be entirely open and consist of an entire side of the frame. Even though the animal caught in the mechanism can be readily reached through the opening in the frame, it is still awkward and difficult to release the grasping parts of the trap, remove the animal body, and reset the trap while the operator is in an uncomfortable or even precarious position.

DESCRIPTION OF THE INVENTION

My invention is a trap for small animals, having a box-like frame and a spring-actuated trap within it, provided with a removeable pipe, bar or other means, preferably secured by a latch, for holding or positioning the trap, so that, when it is removed, as by simply sliding the pipe or bar out of the trap and frame, the trap mechanism, still containing the animal, can be removed as a unit from the frame and replaced with a new trap. An important feature of my trap is that the frame has an open front and back so that the frame may appear to be a part of the pathway in which it is placed.

While my invention will be illustrated with reference to a trap mechanism having a coil spring and wherein the pipe or bar passes through the coil, it is not limited to the coil sprng configuration, but may be embodied in any mechanism for temporarily clamping or holding the trap in the frame.

BEST MODE OF THE INVENTION

Most preferably, my invention improves upon existing commercial traps of the "Conibear" type by equipping the spring-actuated trap and frame with a pipe which loosely passes through the coils and the wall of the frame to hold the trap in position. When the pipe is removed, the entire metal works of the trap are completely unattached and may be removed from the frame.

DETAILED DESCRIPTION OF THE DRAWINGS

Figure 1:
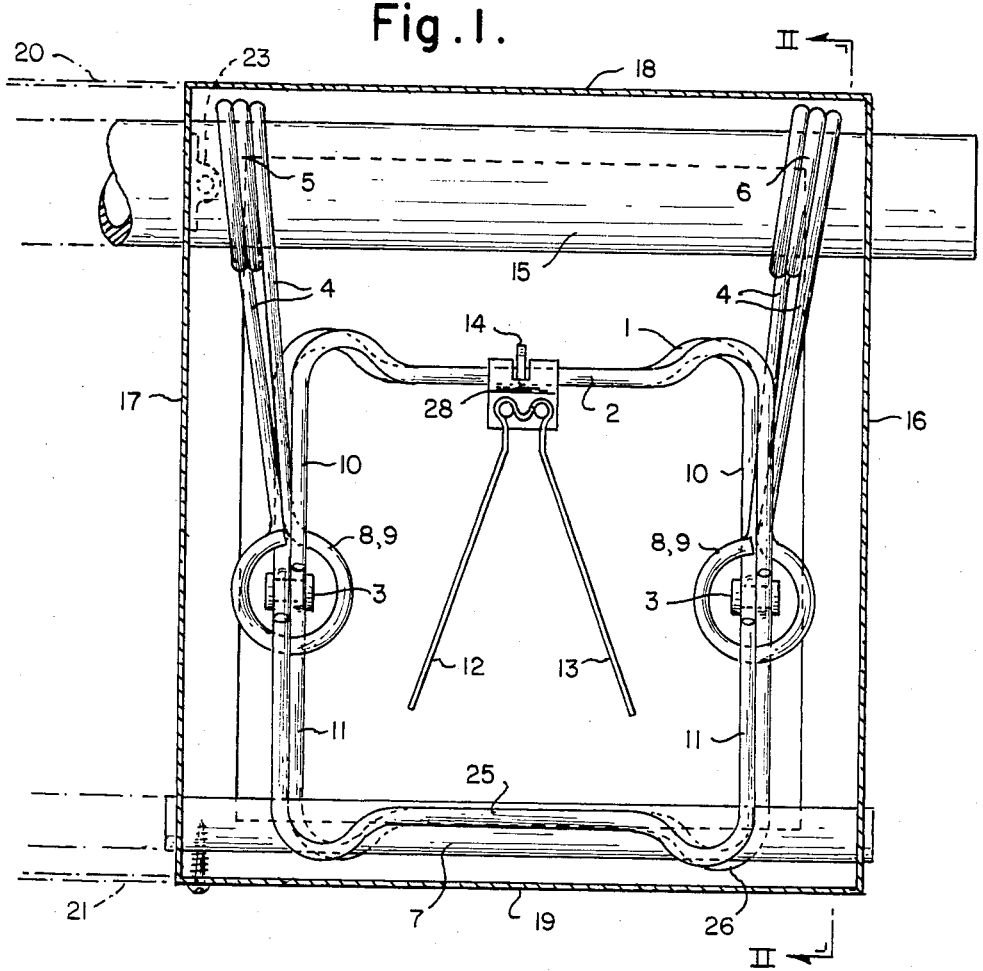
FIG. 1 is a front elevational view of my trap in the set position.

Referring now to FIG. 1, it will be seen that a more or less conventional grasping means 1 and 2 are mounted at joint 3 which is suspended and held by spring actuator 4. Sprng actuator 4 may be, and is in this configuration, an extension of spring coils 5 and 6. The bottom grasping means 25 and 26 are centered with the help of a ledge or small rod guide 7. Rings 8 and 9 contain the arms 10 and 11 of the grasping means and are adapted to slide over the arms 10 and 11 when the trap is actuated. Tripping wires 12 and 13 are mounted on the center of the top grasping means 1 and connect to a trap latch 14 for actuating.

A novel feature of my invention is the inclusion of pipe 15 which passes through frame wall 16, spring coils 5 and 6, and frame wall 17. The frame has a top 18 and a bottom 19, both of which may extend as shown at 20 and 21 to form an adjacent frame through which the pipe 15 may also pass. The frame is open at the front and back so the trap may be placed in an opening or passageway through which the animal may be expected to pass. Where pipe 15 passes through two or more adjacent traps in a single multi-port trap holder, the pipe 15 may support traps in each of the ports and may operate otherwise in exactly the same way as illustrated herein for one trap. The ports or openings in the frame of a multi-port assembly will of course operate to occupy the breadth of a wider passageway or access normally used by the animal.

Figure 2:
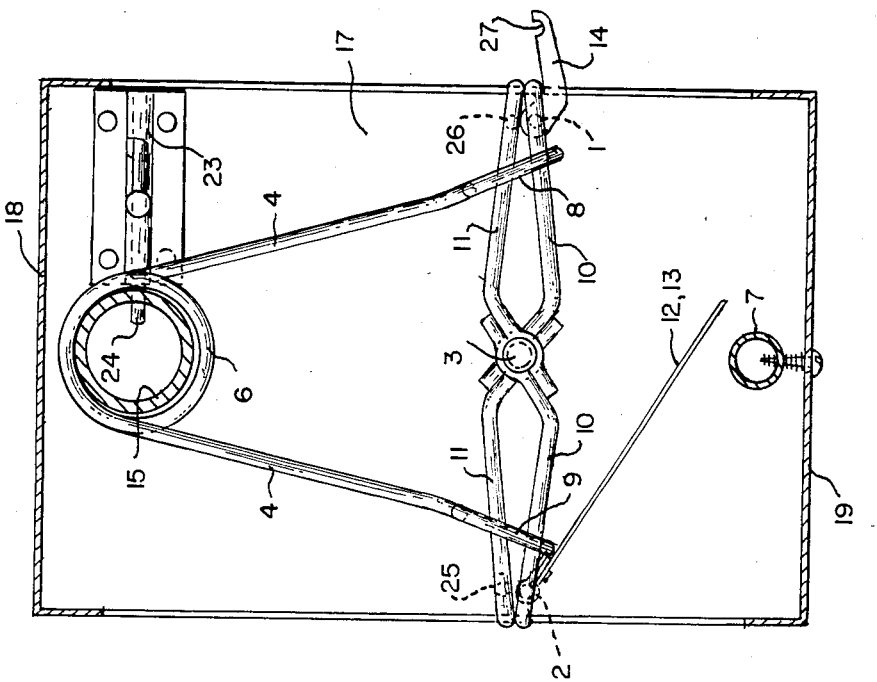
FIG. 2 is a side sectional view also before actuation.

Referring now to FIG. 2, the sectional view of the invention in a set, preactuated mode shows the top 18 of the frame, and bottom 19. My pipe 15 is shown surrounded by spring coils 6 and held in place by a spring loaded latch 23 having a lug 24 which passes through the side of pipe 15. Arms 10 and 11 close to a vertical orientation, grasping means 1 and 2 being lightly held in place by latch 14. Rings 8 and 9 are on the inside of the crossed arms 10 and 11 and are in position to be urged outwardly by spring actuator 4, attached to spring coils 5 and 6. Guide 7 centers the ends of grasping means 25 and 26.

It will be seen that it is not necessary for anything to hold, fix or constrain the trap to the frame except my pipe 15 and guide 7. Guide 7 functions to prevent the trap mechanism from swinging freely in the frame. Nor is it necessary to employ bait, since the trap can easily be placed to obstruct the normal path of an animal in a restricted space. The pipe 15 is easily removed by simply opening latch 23 and sliding the pipe out. This maneuver may be accomplished while the trap is set, not set, or with a caught animal.

Figure 3:
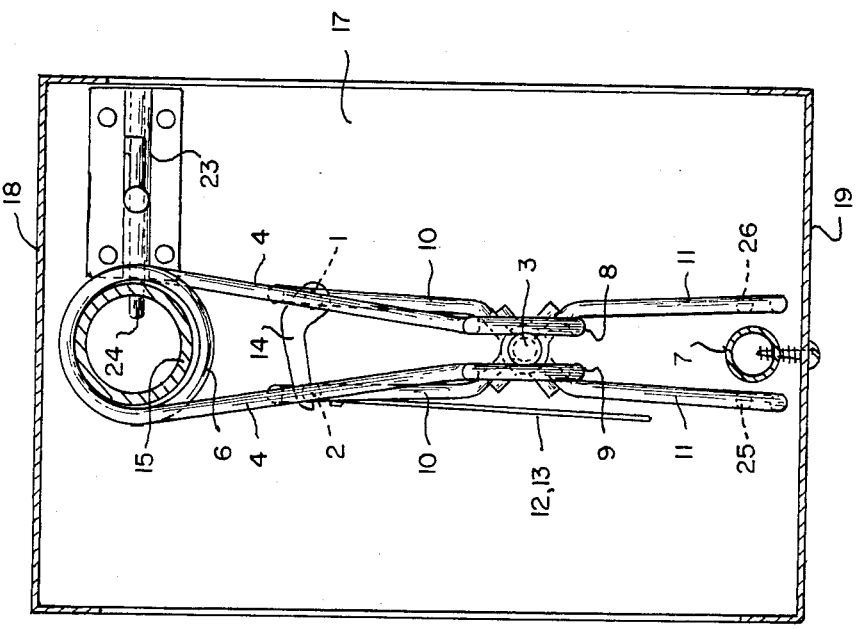
FIG. 3 is a front elevational view of the trap after it is tripped.

Referring now to FIG. 3 the grasping apparatus has been actuated and grasping means 1, 2, 25 and 26 are now in converging positions; rings 8 and 9 are fully transported to the ends of arms 10 and 11. If an animal is caught between grasping means 1 and 26, or between grasping means 2 and 25, the user can simply release latch 24, withdraw pipe 15, and remove the entire trap mechanism from the trap with the animal in it. The same or a different trap mechanism can then be replaced in the trap.

Figure 4:
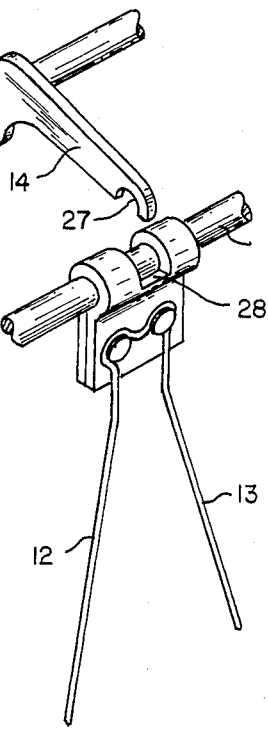
FIG. 4 shows a detail of the trap actuating mechanism.

The detail of FIG. 4 is presented so the mechanism for releasing the spring-actuated device is clear, although this particular mechanism is old in the art and may be considered exemplary. Latch 14 is mounted on grasping means 1; it has a notch 27 which conforms to the shape of grasping means 2. On grasping means 2 is a support or collar for tripping wires 12 and 13, having actuating surface 28 which will dislodge latch 14 when tripping wires 12 or 13 are disturbed.

Persons skilled in the art will recognize that the latch 23 is merely a preferred device for retaining the pipe or bar temporarily in a manner which can easily be dissembled. The latch may be employed on the portion of the pipe which extends from frame 16, for example, and/or the latch may be of a type similar to a clamp, snap, hook and eye or wing nut clamp. I employ the term latch in a more or less generic sense as well as to describe the particular type of latch shown at 23. By latch-actuated I mean that the retaining means is fully operable to retain the trap when the latch is closed. It will also be recognized that the means for retaining the trap need not be a pipe as illustrated, but may be a bar and need not even pass through the coils as illustrated. My invention contemplates the employment of any means for retaining the trap in the frame, which is releasable by a latch or similar mechanism.

Thus it will be seen that my invention permits the user to easily dissemble the trap and reset it or simply replace the trap mechanism, by simply moving latch 23, removing pipe 15, and then removing the trap assembly.

My invention may be otherwise variously embodied and practiced within the scope of the various claims.

I claim:

1. A small animal trap comprising:
   (a) a frame having an entranceway for small animals and an exit opposite said entranceway,
   (b) animal grasping apparatus actuable by coil springs under tension on contact by a small animal,
   (c) a bar or pipe passing through said coil springs to retain the trap in place in the frame, said bar or pipe being readily removeable to disconnect the grasping apparatus from the frame,
   (d) latch means for temporarily retaining said bar or pipe in place to maintain said animal grasping apparatus within the frame, and
   (e) a stabilizing guide in the bottom of said frame to prevent free swinging of said animal grasping apparatus.

* * * * *